United States Patent [19]

Murata

[11] Patent Number: 4,956,860
[45] Date of Patent: Sep. 11, 1990

[54] SYSTEM FOR REPORTING STATUS DATA IN A FACSIMILE NETWORK

[75] Inventor: Tsuneo Murata, Mitaka, Japan

[73] Assignee: Kabushiki Kaisha Toshiba, Kawasaki, Japan

[21] Appl. No.: 134,864

[22] Filed: Dec. 18, 1987

[30] Foreign Application Priority Data

Dec. 19, 1986 [JP] Japan .............................. 61-194395[U]

[51] Int. Cl.⁵ ........................ H04M 11/00; H04N 1/21
[52] U.S. Cl. ..................................... 379/100; 379/88; 358/440
[58] Field of Search ...................... 379/96, 97, 98, 100, 379/40, 88; 358/257

[56] References Cited

U.S. PATENT DOCUMENTS 4,489,438 12/1984 Hughes .................................. 379/88
4,754,335 6/1988 Izawa et al. ......................... 358/257

FOREIGN PATENT DOCUMENTS 0090460 5/1985 Japan ..................................... 379/88
2106354 3/1983 United Kingdom .................. 379/40

OTHER PUBLICATIONS

IEEE Spectrum, "Best Bits–Taking Orders", Jul. 1984, p. 22.

Primary Examiner—Jin F. Ng
Assistant Examiner—Stella L. Woo
Attorney, Agent, or Firm—Finnegan, Henderson, Farabow, Garrett, and Dunner

[57] ABSTRACT

A facsimile system with a multi-address calling function of sequentially transmitting identical original document information to a plurality of destination parties, which informs an operator of a communication result or communication status at different times in the form of voice message by use of telephone set.

13 Claims, 7 Drawing Sheets

| MULTI-ADDRESS NO. | E₁ | E₂ | ... | E₁₀ |
|---|---|---|---|---|
| TELEPHONE NO. | 0426-64-7177 | 0425-86-7447 | | 03-762-9924 |
| 1ST TRY | 2 | 1 | | 0 |
| 2ND TRY | 2 | 0 | | 3 |
| 3RD TRY | 0 | 3 | | 3 |

0 ----- NORMAL TERMINATION
1 ----- ABNORMAL COMMUNICATION
2 ----- LINE IS BUSY
3 ----- BEFORE TRYING

SYSTEM FOR REPORTING STATUS DATA IN A FACSIMILE NETWORK

BACKGROUND OF THE INVENTION

The present invention relates to a facsimile system which has a so-called multi-address calling function of transmitting identical original information to a plurality of parties.

Figure 1:
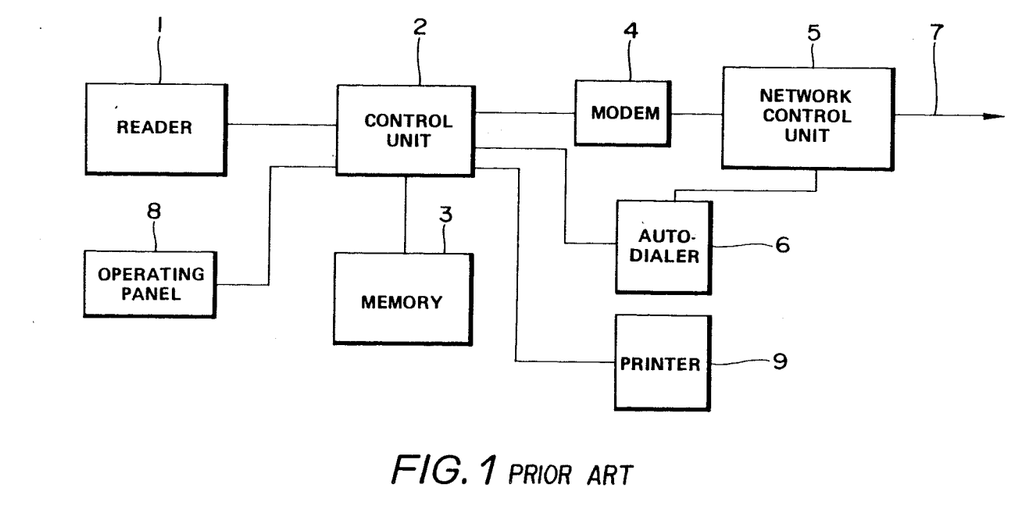
FIG. 1 is a block diagram showing an example of a prior art facsimile system.

An example of prior art facsimile systems of the type referred to is shown in FIG. 1. The facsimile system has such a multi-address calling function that application of a multi-address calling instruction from an operating panel 8 to a control unit 2 causes an automatic dialing set 6 to sequentially call telephone numbers of a plurality of parties and transmit identical original information thereto. The multi-address calling function of the prior art system will be detailed by referring to a flowchart of FIG. 2.

Figure 2:
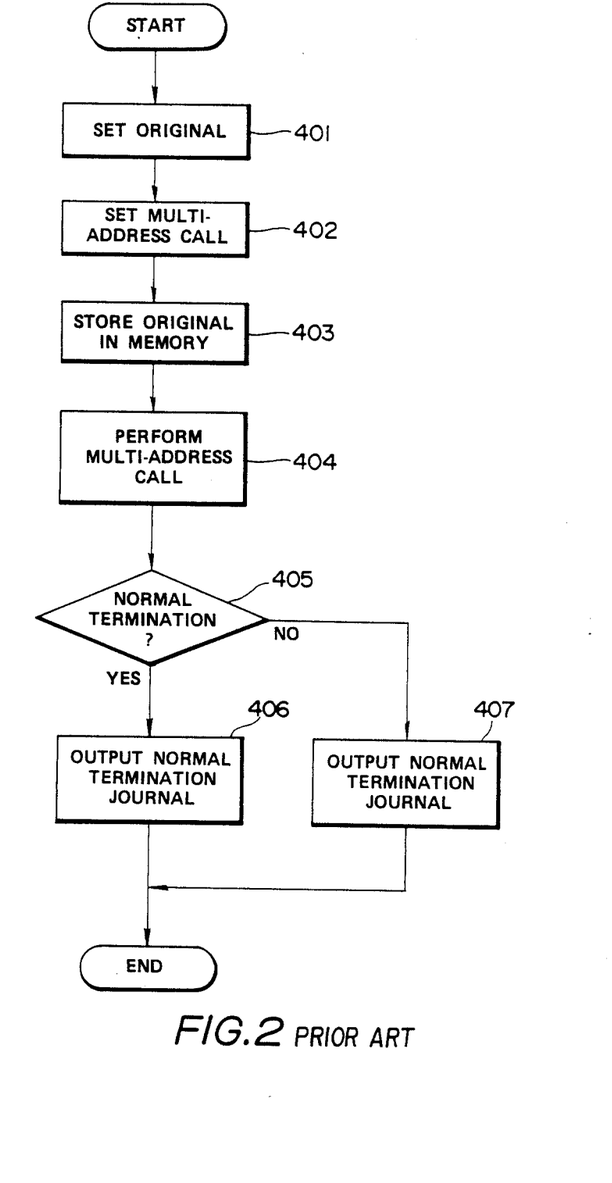
FIG. 2 is a flowchart illustrating the operation of the system shown in FIG. 1.

First, at a step 401, an original document to be multi-address called is set on a reader 1. Then at a step 402, a "multi-address call" key at the operating panel 8 is depressed to send a multi-address calling instruction to the control unit 2. At a step 403, the control unit 2 stores picture data of the original read by the reader 1 into a memory 3. The control unit 2, at a step 404, reads out of the memory 3 one of telephone numbers (which are previously stored in the memory 3) to be multi-address called and supplies it to the autodialer 6 which in turn sends a dial signal to a line 7 through a network control unit 5, whereby the facsimile equipment is connected to the party facsimile equipment. Thereafter, control unit 2 reads the picture data out of the memory 3 and transmits it onto the line 7 through a modem 4 and the network control unit 5. After having transmitted the picture data to one destination, the control unit 2 completes its communication with the destination facsimile equipment and cuts off the line. After this, the control unit 2 reads the second destination telephone number from the memory 3 and sends it to the autodialer 6. This causes the autodialer 6 to send a dial signal onto the line 7 through the network control unit 5, so that the present facsimile equipment is connected to the second destination facsimile equipment, after which the control unit 2 reads the same picture data as in the first case out of the memory 3 and sends it to the second destination facsimile equipment. In this manner, the control unit 2 sequentially reads all of the destination telephone numbers to be multi-address called in order to sequentially transmit the same picture data to these destinations. In the multi-address calling operation at the step 404, if the calling facsimile equipment cannot be connected to the destination office due to a busy office line or if transmission of the original to any of the destinations results in abnormal termination, then the control unit 2 tries the transmission the predetermined number of times and starts its transmission to the next destination, in which case the control unit 2 stores the busy and abnormal-termination destination offices in the memory 3. Next, the control proceeds to a step 405 where the control unit 2 retrieves data from the memory 3 and judges whether or not the multi-address calling communication has been normally terminated over all the destination offices. When it is judged that communication terminated normally, the control goes to a step 406. If not then the control goes to a step 407. At the step 406, the control unit 2 causes a printer 9 to output an normal termination journal, completing the processing. At the step 407, the control unit 2 reads out from the memory 3 the destination offices which have been busy and abnormally terminated, controls to cause the printer 9 to output these offices as an abnormal termination journal and subsequently completing the processing.

In this way, the prior art facsimile system has been defective in that, in order to confirm the result of whether the multi-address calling communication has been normally or abnormally terminated, the operator must take the trouble, after completion of the multi-address calling communication, to go to the place where the printer 9 is installed to check it, which is highly inconvenient to the operator working in a different place from the printer.

SUMMARY OF THE INVENTION

An object of the present invention is, therefore, to provide a facsimile system that allows an operator to simply and readily know the communication result.

Another object of the present invention is to provide a facsimile system which allows an operator to efficiently and easily know communication state at different times.

That is, in the present invention, the facsimile system automatically calls a specified telephone set to inform the operator of the communication result in the form of voice.

In accordance with the present invention, the above objects can be realized by providing a facsimile system which comprises means for issuing an instruction to transmit a communication result after completion of communication, memory means for registering a telephone number of a telephone set to which the communication result is to be transmitted, for storing therein a plurality of message information corresponding to a plurality of such different communication results, means for controllably performing line interconnection with the telephone set having the telephone number registered in the memory means when there is an instruction issued from the transmission instruction means after the communication completion, and means for, after the communication completion, reading out from the memory means the message information corresponding to the then communication result and for sending a voice signal corresponding to the read message information to the telephone set line-connected by the interconnection control means.

Therefore, in accordance with the present invention, it becomes possible for an operator to confirm a result of such time-consuming multi-address calling communication by means of a telephone set located nearby without taking the trouble to go to a place where a facsimile equipment is installed. As a result, the operator can easily and conveniently confirm the communication result and can use the saved time for another job.

Further, the present invention is arranged so that by calling a facsimile equipment with use of a telephone during multi-address calling operation, an operation can positively confirm the communication state at different times.

In accordance with another aspect of the present invention, the facsimile system comprises a memory means for renewing and storing communication status information indicative of communication state between the originating facsimile equipment and a plurality of destination facsimile equipment in response to a change in the communication state, means for detecting an incoming call from a telephone set during multi-address calling operation, means for identifying predetermined tone information, and means for reading out current status information stored in the memory means and for sending a voice signal corresponding to the read-out memory contents to the telephone set, after the incoming call is detected by the incoming call detection means and the tone information is detected by the tone information identifying means.

DESCRIPTION OF THE PREFERRED EMBODIMENTS

Embodiments of the present invention will be explained with reference to drawings.

Figure 3:
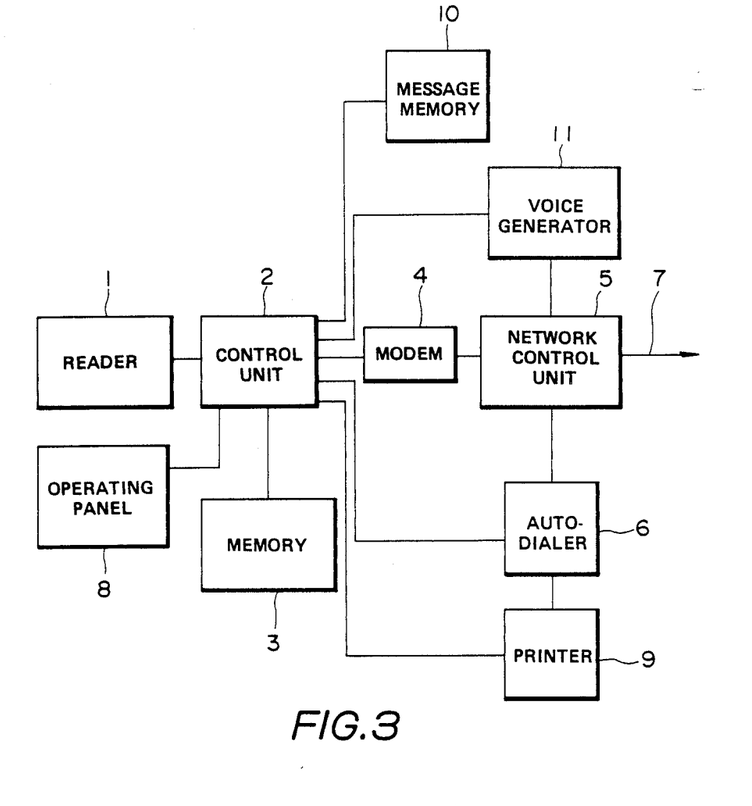
FIG. 3 is a block diagram showing an embodiment of a facsimile system in accordance with the present invention.

Referring first to FIG. 3, there is shown an embodiment of a facsimile system in accordance with the present invention, in which the same parts as those in the prior art of FIG. 1 are denoted by the same reference numerals. That is, in FIG. 3, reference numeral 1 denotes a reader which reads contents of an original document set thereon. Reference numeral 2 denotes a control unit which performs controls over the entire system including a multi-address calling control. Reference numeral 3 denotes a memory which stores therein such various data as destination telephone numbers to be multi-address called, telephone numbers which have been busy and abnormally terminated during multi-address calling operation, messages for the voice generator and picture data. In this embodiment, the memory means is implemented with a single memory, the various kinds of data being stored in separate areas of the memory. The invention is not limited to this configuration, however, and may be implemented with multiple memories, the various kinds of data each being stored in its own memory. Reference numeral 4 denotes a modem which modulates and demodulates transmitting and received data. Reference numeral 5 denotes a network control unit which controls originating call, release, dialing, and the like for connection control of a line switching network. Reference numeral 6 denotes an automatic dialing set which generates a dialing signal for a given telephone number. Reference numeral 7 denotes a telephone line. References numeral 8 denotes an operating panel from which various instructions including a multi-address calling operation instruction, dial information, and the like are sent to the control unit 2. Reference numeral 9 denotes a printer which outputs received picture data and various types of journals in the form of printed paper. Reference numeral 11 denotes a voice generator which converts a given message to a voice signal.

Figure 4:
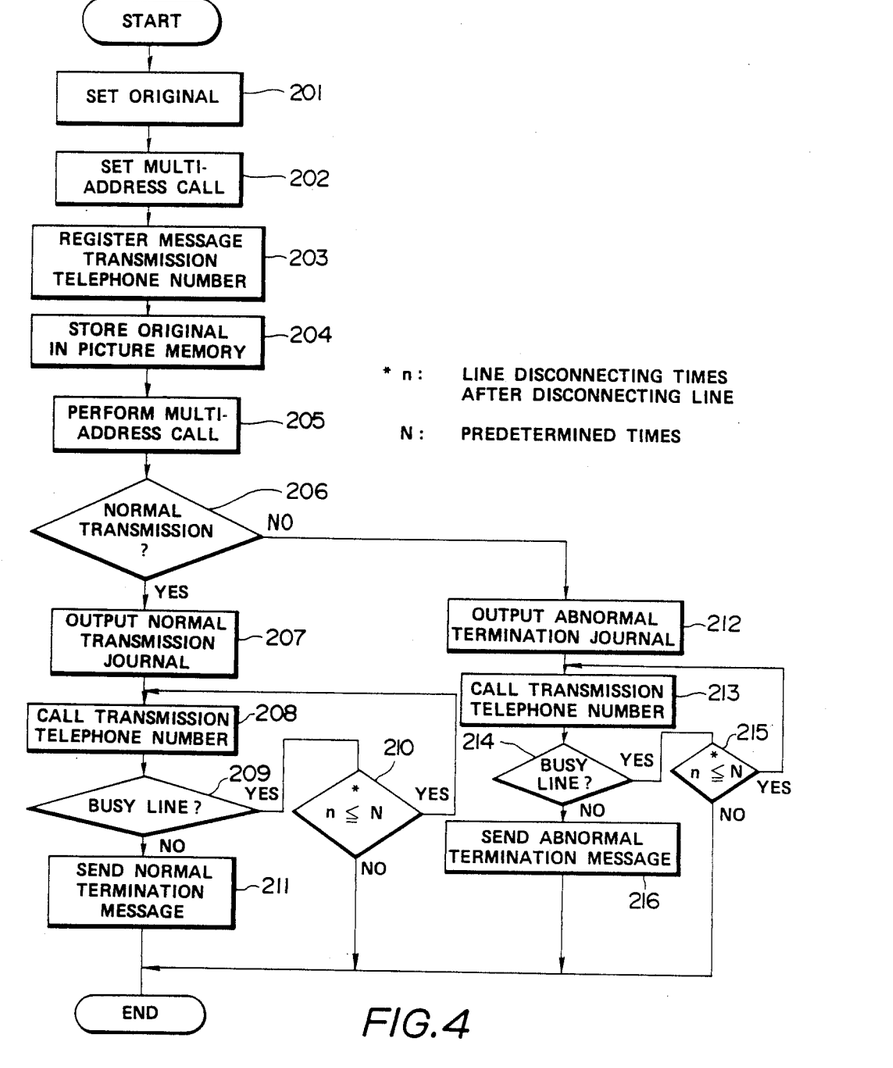
FIG. 4 is a flowchart illustrating the operation of the system shown in FIG. 3.

Explanation will next be made as to the operation of the present embodiment by referring to the flowchart shown in FIG. 4. First of all, at a step 201, an original document to be multi-address called is set at the reader 1. Then at a step 202, an operator pushes a "multi-address calling" key on the operating panel 8 to provide a multi-address calling instruction to the control unit 2. Next, at a step 203, the operator inputs an instruction demanding a communication-end message into the control unit 2 through the operating panel 8 and then inputs into the control unit 2 a telephone number for a destination to which the communication-end message is to be transmitted. This causes the control unit 2 to store the transmission telephone number inputted therein into memory 3. At a step 204, picture data read by the reader 1 is stored in the memory 3 under the control of the control unit 2. At a step 205, the control unit 2 reads out from the memory 3 the multi-address call destination number previously stored to achieve an interconnection between the local facsimile equipment and a destination office by the autodialer 6. After this, the control unit 2 reads out the picture data from the memory 3 and transmits it to the party. The above operation is repeated for each remaining destination office to complete the multi-address calling operation. During the multi-address calling operation, if there exist offices to which the present facsimile equipment could not be connected due to a busy office line or if transmission of the picture data has been abnormally terminated, then the control unit 2 stores data indicating these offices and the abnormal condition in the memory 3. The control unit 2 then retrieves the contents of the memory 3 and determines at a step 206 whether the multi-address calling operation has been normally or abnormally terminated. In this connection, the control unit 2 determines that a normal termination has occurred when the following conditions are satisfied:

1. After the control unit tries the line interconnection the predetermined number of times (for example, three times) for the multi-address calling communication, there does not exist any single office that cannot be connected to the present system due to the busy office line.
2. There exists no single abnormally-terminated communication during the multi-address calling operation.
3. No trouble occurs in the originating facsimile equipment such that memory contents, for example, picture data, disappear during the multi-address calling operation.

When the control unit 2 determines that a normal termination has occurred the control proceeds to a step 207, while when the control unit 2 determines that an abnormal termination has occurred the control proceeds to a step 212. At the step 207, the control unit 2 orders the printer 9 to output a normal termination journal and subsequently the control is transferred to a step 208 where the control unit 2 reads out from the memory 3 the telephone number of the destination to which the message is to be transmitted and sends it to the autodialer 6. As a result, the autodialer 6 sends the dial signal onto the line 7 through the network control unit 5. At a step 209, the control unit 2 judges whether or not the telephone set to which the signal is to be transmitted is busy. If it is busy, the control unit 2 disconnects the line at a step 210. After this, if the number of disconnect times is smaller than a predetermined number then the control returns to the step 208, whereas if the number of disconnect times exceeds the predetermined number then the processing is terminated. When the line is busy, a predetermined wait time until the next line connecting processing is performed is set. If the line is not busy at the step 209, then the control proceeds to a step 211 where the control unit 2 reads out from the message memory 10 a message code indicative of, for example, "having been normally terminated" and applies it to the voice generator 11. The voice generator 11 produces a voice signal corresponding to the received message code and transmits the signal to the party telephone set through the network control unit 5 and line 7. At this stage, the processing is completed. That is, in this case, the control unit 2 tries the predetermined number of the message transmission processings for the registered destination office in such a manner that if the line has been connected by a number of transmission tries less than a predetermined number then the control unit 2 transmits the predetermined normal-termination message to the destination office, whereas if the line connection is not attained by the predetermined number of tries then the processing is terminated.

On the other hand, when the communication is not normally terminated in step 206 and the control goes to the step 212, the printer 9 prints out an abnormal termination journal under the control of the control unit 2 and then the control goes to a step 213. At the step 213, as in the above case, the control unit 2 reads out from the memory 3 a telephone number of a destination office to which the message is to be transmitted and sends it to the autodialer 6, whereby the dial signal is sent onto the line 7. At a next step 214, the control unit 2 determines whether the party telephone set is busy or not. As in the above case, if the telephone line is busy then the control goes to a step 215 to disconnect the line. After this, when the number of disconnect times has not reached a predetermined value, the control returns to the step 213, while when the number of disconnect times exceeds the predetermined value, the processing is terminated. At the step 214, if the line is not busy, then the control goes to a step 216 where the control unit 2 reads out from the message memory 10 a message code corresponding to the abnormal contents stored in the memory 3 and applies it to the voice generator 11, whereby a message corresponding to the message code, for example, a message telling that "data was not transmitted to the second office" is sent to the destination office and then the processing is terminated.

In accordance with the present embodiment, since the operator can be informed of the communication result by means of a telephone placed nearby, he or she can confirm the result of such time consuming communication as the multi-address calling communication without taking the trouble to go to a place where the facsimile equipment is located. As a result, it is possible for the operator to confirm the communication result easily and conveniently and thus the operator can use the saved time for other jobs.

Next explanation will be directed to another embodiment of the present invention. That is, the present embodiment is arranged so that an operator can confirm the current communication status by calling a party facsimile equipment with use of a telephone during the multi-address calling operation, although the communication result after completion of the multi-address calling operation is transmitted in the form of a voice to a destination telephone set in the foregoing embodiment.

Figure 5:
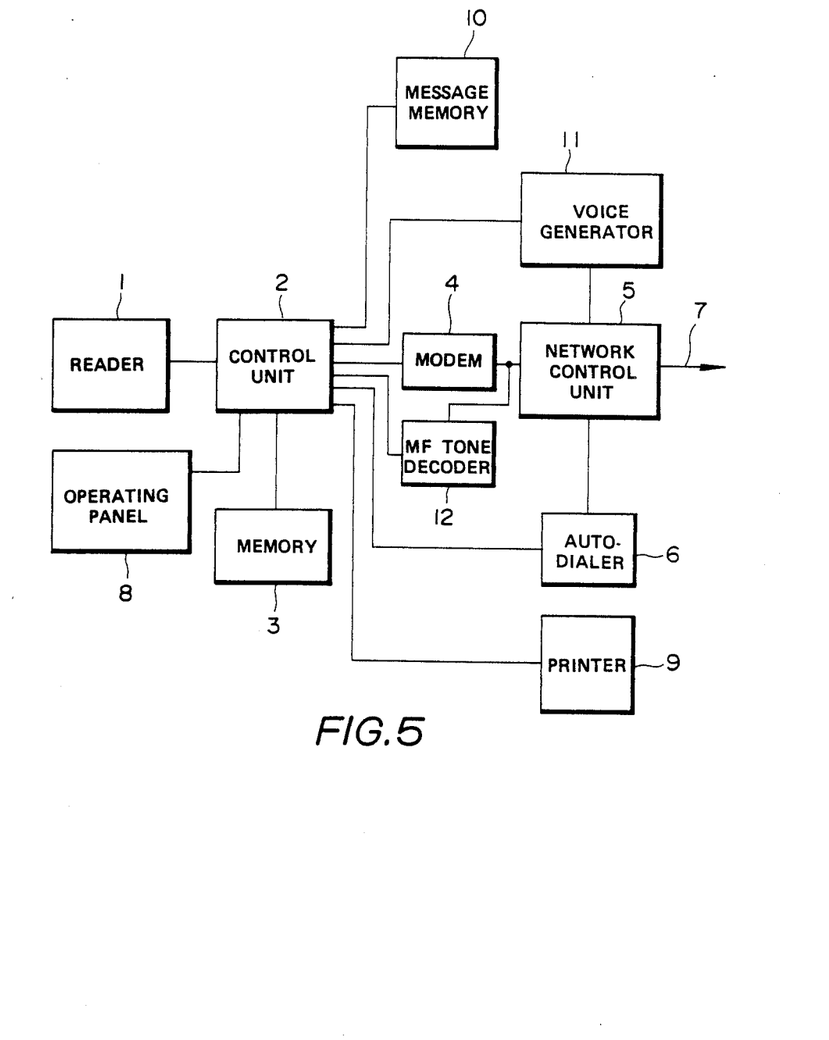
FIG. 5 is a block diagram showing another embodiment of the facsimile system in accordance with the present invention.

FIG. 5 shows a facsimile system of the second embodiment realizing such a function, in which the modem 4 functions as an incoming call detecting means, and the control unit 2 functions as a means for connecting the facsimile apparatus with a line. An MF tone decoder 12 is newly added in addition to the constituent components shown in FIG. 3. The MF tone decoder 12 is provided to decode a predetermined tone signal indicative of a message transmission request received from its telephone side.

Further, in the second embodiment, the memory 3 stores therein the multi-address calling status at different times. The contents of the memory 3 is renewed by the control unit 2 each time the communication status varies.

Figure 6:
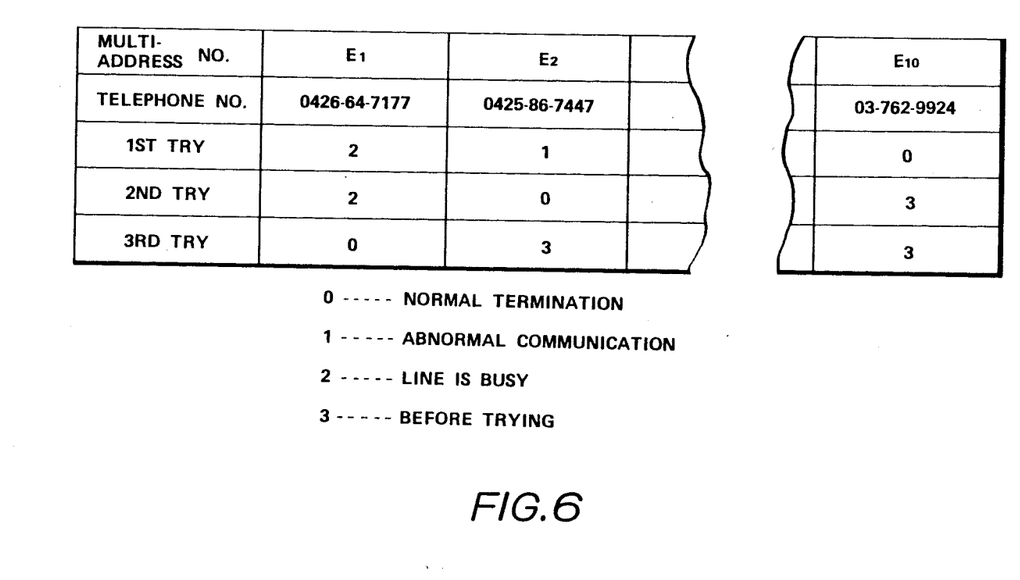
FIG. 6 shows an example of the contents of a memory in the embodiment of FIG. 5.

FIG. 6 illustrates an example of such memory contents, in which case ten offices $E_1$ to $E_{10}$ are multi-address called and up to 3 line connection processings are tried for each one of the offices. In the drawing, "0", "1", "2" and "3" indicate normal termination, abnormal communication, busy line, and status before transmission try, respectively. Therefore, in this case, the status of one of the offices corresponding to 3 tries can be expressed by 6 bits.

Figure 7:
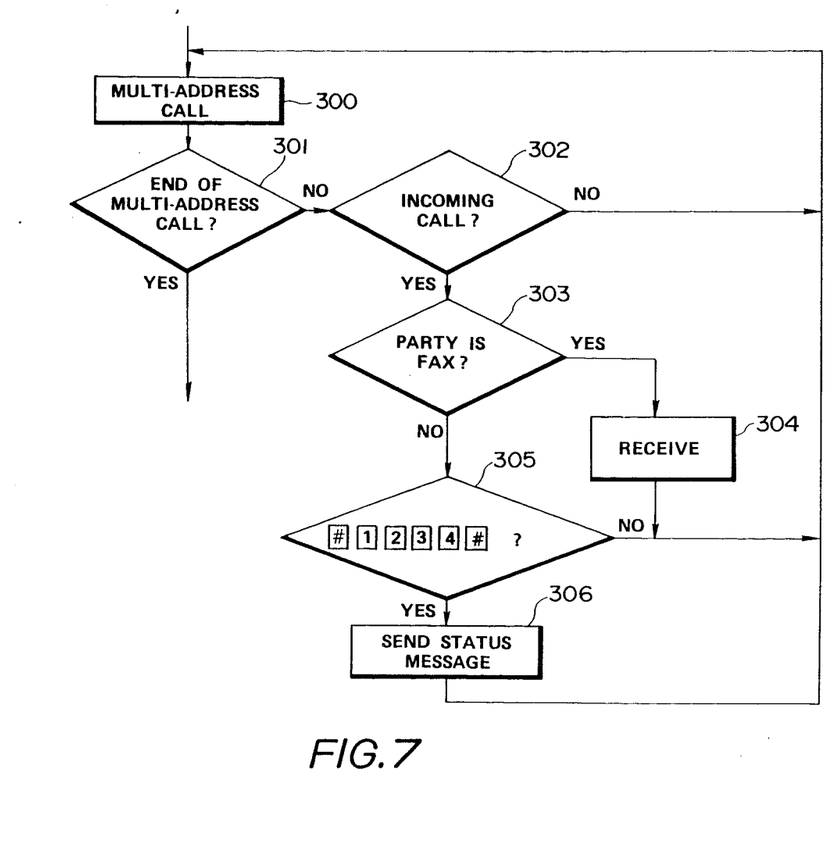
FIG. 7 is a flowchart illustrating the operation of the system of FIG. 5.

The operation of the facsimile system of FIG. 5 will next be explained by referring to a flowchart shown in FIG. 7. When an operator wants to confirm the communication status during the multi-address calling operation, he dials a nearby telephone set over the associated facsimile equipment. After such dialing has caused interconnection between the telephone set and the facsimile equipment, the operator transmits to the facsimile equipment a predetermined tone signal, for example, by pushing keys #, 1, 2, 3, 4, # of the telephone to require message transmission from the facsimile equipment.

It is contemplated that the apparatus of the invention can operate on the receiving side of a picture data communication as well as the sending side, as has been described above. When the control unit 2 detects an incoming call during the multi-address calling operation and before the multi-address calling operation ends (steps 300, 301 and 302), the control unit 2 also determines whether the incoming call comes from the facsimile equipment or telephone set (step 303). If the facsimile equipment is in communication with the multi-address calling destination and there is a call in the facsimile equipment, a busy signal is transmitted to the calling party.

At the step 303, if the control unit 2 determines that the party is the facsimile equipment, then the unit 2 connects the local equipment to the party facsimile and thereafter receives picture data sent from the party facsimile equipment, so that the received picture data is stored in the memory 3 or is printed out by the printer 9 (step 304).

If the control unit 2 determines at the step 303 that the party is the telephone, however, then the unit 2 connects the present equipment to the party telephone set under the control of the network control unit 5, after which the unit 2 determines on the basis of an output of the MF tone decoder 12 whether or not the present facsimile equipment has received the message transmission request instruction, for example, the tone sequence #, 1, 2, 3, 4, # from the party telephone set (step 305). If the decision is YES, then the control unit 2 confirms the current communication status on the basis of the contents of the memory 3, reads out from the memory 3 a message code corresponding to the current communication status, and then sends the message code to the voice generator 11. The voice generator 11 transmits through the network control unit 5 to the party telephone set a voice message corresponding to the received message code such as, "the transmission for the ten offices has been normally terminated", "the office 1 has been twice busy", "the office 3 has once been abnormal in communication", or "the remaining 3 offices are not transmitted yet". The operator on the side of the telephone set can confirm the current multi-address calling status by listening to this message through the telephone.

In this way, since the operator can confirm the multi-address calling status at different times by calling the facsimile equipment from a telephone set in the second embodiment, he can confirm the communication status efficiently, easily, and conveniently.

It should be understood that the present invention is not limited only to the particular foregoing embodiments and may be modified in various ways. For example, the facsimile equipment may be arranged to correspond to a combination of the foregoing two embodiments, that is, that, during communication, the equipment can allow the operator to confirm the communication status at different times in the form of voice by transmitting a message transmission request signal from a telephone set, and, after completion of the communication, the equipment can inform, in the form of voice, the operator of the communication result by means of a predetermined registered telephone set.

In addition, an arrangement such as the arrangement disclosed in the foregoing embodiments that informs an operator of the communication status or the communication result by telephone in the form of voice message can be applied not only to a facsimile having a multi-address calling function but also to a facsimile capable of transmitting to only one office.

What is claimed is:

1. A facsimile apparatus having a multi-address calling function of sequentially transmitting identical picture data to a plurality of destination parties, wherein an abnormality can occur during the multi-address calling procedure, said apparatus comprising:
   instruction issuing means for issuing an instruction to transmit a communication result after completion of communication;
   a memory means for registering a telephone number of a telephone set to which said communication result is to be transmitted, data concerning a destination office with which line interconnection could not be made, data on a destination office in which facsimile communication has abnormally terminated, and a content of the abnormality during the multi-address calling operation;
   means for controllably performing line interconnection with the telephone set having the telephone number registered in said memory means when there is an instruction issued from said instruction issuing means after the communication is completed;
   message information generating means for judging whether or not the communication has performed normally based on the content of said memory means after completion of the multi-address calling operation, and for generating message information indicative of the destination office with which line interconnection could not be made, the destination office of which facsimile communication has abnormally terminated and the content of the abnormality, the message information corresponding to a result of the judgement;
   journal outputting means for outputting a journal on which the generated message information is printed; and
   message transmitting means for converting the generated message information into a voice corresponding to the generated message information and then transmitting by said line interconnection control means the voice to the telephone set connected with the line.

2. A Facsimile apparatus as set forth in claim 1, wherein the message transmitting means includes a voice generator and a message memory whose contents are applied to the voice generator to convert the message information into a voice.

3. A facsimile apparatus as set forth in claims 1 or 2, wherein during the multi-address calling operation, said multi-address calling means tries the picture data transmission control once for each of said plurality of parties and if one of the parties is busy, once disconnects the line and after a predetermined time elapses, again repetitively executes the line connection to the party which has been busy for a predetermined number of times.

4. A facsimile apparatus as set forth in claims 1 or 2, further including a multi-address calling means for sequentially transmitting identical picture data to a plurality of destination parties, wherein said message information generating means includes means for judging whether the communication has been normally or abnormally terminated, wherein the normality/abnormality judging means judges the termination to be normal when there is not a single party office which could not be connected due to its busy line, when there is no abnormal communication termination and when there are no problems in said originating facsimile equipment, after completion of the multi-address calling operation.

5. A facsimile apparatus as set forth in claims 1 or 2, wherein when a connection party is busy, said interconnection control means once disconnects the line and after a predetermined time elapses, again repetitively executes the line connection for a predetermined number of times.

6. A facsimile apparatus comprising:
   a memory for storing a current state of the facsimile apparatus;
   incoming call detecting means for detecting an incoming call from a telephone set;
   means for identifying predetermined tone information associated with said incoming call;
   means for controllably performing line interconnection with the telephone set when said incoming call of the telephone set is detected by said call detection means; and
   means for reading out the current state of the facsimile apparatus from said memory and for sending a voice corresponding to the read-out memory contents to said telephone set when said tone information identifying means detects said tone information.

7. A Facsimile apparatus as set forth in claim 6, wherein the means for reading out the current state includes a voice generator and a message memory whose contents are applied to the voice generator to convert the state information into a voice.

8. A facsimile apparatus as set forth in claims 6 or 7, further comprising:
   means for determining whether the incoming call detected by said incoming call detection means is transmitted from a facsimile apparatus or from a telephone set;
   means for connecting the facsimile apparatus with a line when the determining means outputs a result that the incoming call is sent from the facsimile apparatus; and
   means for performing facsimile communication to the facsimile apparatus connected with the line.

9. A facsimile apparatus having a multi-address calling function of sequentially transmitting identical picture data to a plurality of destination parties, the apparatus comprising:
   a memory means for renewing and storing communication status information indicative of a communication state with the plurality of parties in response to a change in the communication state;
   means for detecting an incoming call from a telephone set;
   means for identifying predetermined tone information associated with the incoming call;
   means for controllably performing line interconnection with the telephone set when the incoming call from the telephone set is detected by the incoming call detection means; and
   means for reading out communication status information from the memory means and for sending a voice corresponding to the read-out memory contents to the telephone set when the tone information identifying means detects the tone information.

10. A Facsimile apparatus as set forth in claim 9, wherein the means for sending a voice includes a voice generator and a message memory whose contents are applied to the voice generator to convert the communication status information into a voice.

11. A facsimile apparatus as set forth in claims 9 or 10, further comprising:
   determining means for determining whether the incoming call detected by said incoming call detection means is transmitted from a facsimile apparatus or from a telephone set;
   means for connecting the facsimile apparatus with a line when the determining means outputs a result that the incoming call is sent from a facsimile apparatus; and
   means for performing facsimile communication with the facsimile apparatus connected with the line facsimile.

12. A facsimile apparatus as set forth in claim 9 or 10, further comprising means for attempting to establish communication, during the multi-address calling operation, once for each of the plurality of parties and if one of the parties is busy, for disconnecting the line and, after a predetermined time lapses, for again repetitively attempting to establish communication with the party which has been busy for a predetermined number of times.

13. A facsimile apparatus as set forth in claim 12, wherein said communication status information includes information indicative of whether or not each of said plurality of parties has been normally terminated, information indicative of a busy line, and information indicative of the parties with which communication could not be established within a predetermined number of times.

* * * * *